United States Patent
Lu et al.

(10) Patent No.: US 7,248,878 B2
(45) Date of Patent: Jul. 24, 2007

(54) INFORMATION STORAGE FOR RADIO RESOURCE MANAGEMENT

(75) Inventors: Guang Lu, Verdun (CA); Renuka Racha, Ronkonkoma, NY (US); Mehrdad Haghighi, Newark, NJ (US); Xiaochun Xu Fisher, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 124 days.

(21) Appl. No.: 10/681,026

(22) Filed: Oct. 8, 2003
(Under 37 CFR 1.47)

(65) Prior Publication Data

US 2004/0192317 A1    Sep. 30, 2004

Related U.S. Application Data

(60) Provisional application No. 60/417,416, filed on Oct. 9, 2002.

(51) Int. Cl.
    *H04Q 7/20* (2006.01)
(52) U.S. Cl. .................. 455/450; 455/464; 455/509; 370/329
(58) Field of Classification Search ............. 455/450, 455/560, 561, 422.1, 424, 436, 439, 445, 455/515, 522, 464, 509; 370/329
See application file for complete search history.

(56) References Cited

U.S. PATENT DOCUMENTS

| | | | |
|---|---|---|---|
| 5,579,306 A | 11/1996 | Dent | |
| 5,886,988 A | 3/1999 | Yun et al. | |
| 6,473,422 B2 * | 10/2002 | Hall et al. | 370/352 |
| 6,473,442 B1 | 10/2002 | Lundsjö et al. | |
| 6,721,568 B1 | 4/2004 | Gustavsson et al. | |
| 6,778,812 B1 | 8/2004 | Zhang | |
| 6,801,515 B1 | 10/2004 | Ishikawa et al. | |
| 6,842,618 B2 | 1/2005 | Zhang | |
| 6,865,393 B1 | 3/2005 | Baum et al. | |
| 2001/0036823 A1 * | 11/2001 | Van Lieshout et al. | 455/418 |
| 2002/0009061 A1 * | 1/2002 | Willenegger | 370/328 |
| 2002/0077068 A1 | 6/2002 | Dent | |
| 2002/0094817 A1 * | 7/2002 | Rune et al. | 455/450 |
| 2002/0119796 A1 * | 8/2002 | Vanghi | 455/522 |
| 2003/0050097 A1 * | 3/2003 | Amirijoo et al. | 455/560 |
| 2003/0069014 A1 | 4/2003 | Raffel et al. | |
| 2003/0081569 A1 | 5/2003 | Sexton et al. | |

* cited by examiner

*Primary Examiner*—Joseph Feild
*Assistant Examiner*—S. Smith
(74) *Attorney, Agent, or Firm*—Volpe and Koenig, P.C.

(57) ABSTRACT

A controlling radio network controller (C-RNC) for use in radio resource management (RRM) functions includes a radio resource management function for managing radio resources. The RRM function uses data stored in a common database, including cell data and wireless transmit/receive unit (WTRU) data. The cell data includes resource assignment information for a cell, and the WTRU data includes WTRU capability and WTRU radio link information.

21 Claims, 5 Drawing Sheets

INFORMATION STORAGE FOR RADIO RESOURCE MANAGEMENT

CROSS REFERENCE TO RELATED APPLICATION(S)

This application claims priority from U.S. Provisional Application No. 60/417,416 filed Oct. 9, 2002, which is incorporated by reference as if fully set forth herein.

FIELD OF INVENTION

The present invention relates generally to radio resource management in wireless communication systems, and more particularly, to information storage in wireless communication systems.

BACKGROUND

In wireless communication systems, radio resource management (RRM) is responsible for utilization of the air interface resources. RRM is generally called upon for three reasons: to guarantee quality of service (QoS), to maintain the planned coverage area, and to offer high capacity. Call admission control (CAC) is a part of RRM. The CAC function accepts or rejects a request to establish a radio access bearer channel in the radio access network. The RRM CAC function is generally located in the controlling radio network controller (C-RNC), where the load information from several cells can be obtained.

In general, whenever a call is received, the RRM CAC function in the C-RNC will determine whether sufficient physical resources are available to meet the requirements of the call. If the resources are available, the CAC function will allocate the resources for the call; otherwise it will reject the request. Improper call admission decisions result in sub-optimal radio resource allocations. This can lead to unnecessary dropped calls or idle resources.

If the information needed during CAC was collected "on the fly," there would be a processing delay imposed because the C-RNC would need to query several different entities to gather all of the information. Such a manner of collection would also add the risk that the required information is not available, causing either the failure of CAC or an unacceptably long delay in obtaining the information.

SUMMARY

The present invention provides a system and method for storing information regarding the allocation and availability of physical resources in a wireless communications system. The system determines the information that should be stored and made accessible by RRM algorithms, how the information should be stored, how the RRM algorithms may query and interact with the information, and how to efficiently access the information.

A controlling radio network controller (C-RNC) for use in radio resource management (RRM) functions includes a radio resource management function for managing radio resources. The RRM function uses data stored in a common database, including cell data and wireless transmit/receive unit (WTRU) data. The cell data includes resource assignment information for a cell, and the WTRU data includes WTRU capability and WTRU radio link information.

A method for improving the performance of radio resource management (RRM) functions in a wireless communications system begins with providing a data storage and storing resource allocation information for the wireless communication system in the data storage. The data storage is accessed by a RRM function, wherein the RRM function obtains current resource allocation information for the wireless communication system. The RRM function is performed and the data storage is updated based upon changes to the resource allocation in the wireless communication system made by the RRM function.

BRIEF DESCRIPTION OF THE DRAWINGS

A more detailed understanding of the invention may be had from the following description of a preferred embodiment, to be understood in conjunction with the accompanying drawings wherein.

DETAILED DESCRIPTION OF THE PREFERRED EMBODIMENTS

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a base station, a Node-B, a site controller, an access point, or other interfacing device in a wireless environment.

The preferred embodiment enables efficient operation of radio resource management (RRM) call admission control (CAC) in the event of an incoming call and offers advantages over existing CAC methods, including centralized information storage at the controlling radio network controller (C-RNC), an extensible data structure that can be used by other RRM algorithms, and speed and ease of locating information, although all of the features and advantages of the preferred embodiment are not needed in alternate embodiments. Additionally, the centralized stored information can be used for other RRM procedures and network activities.

Figure 1:
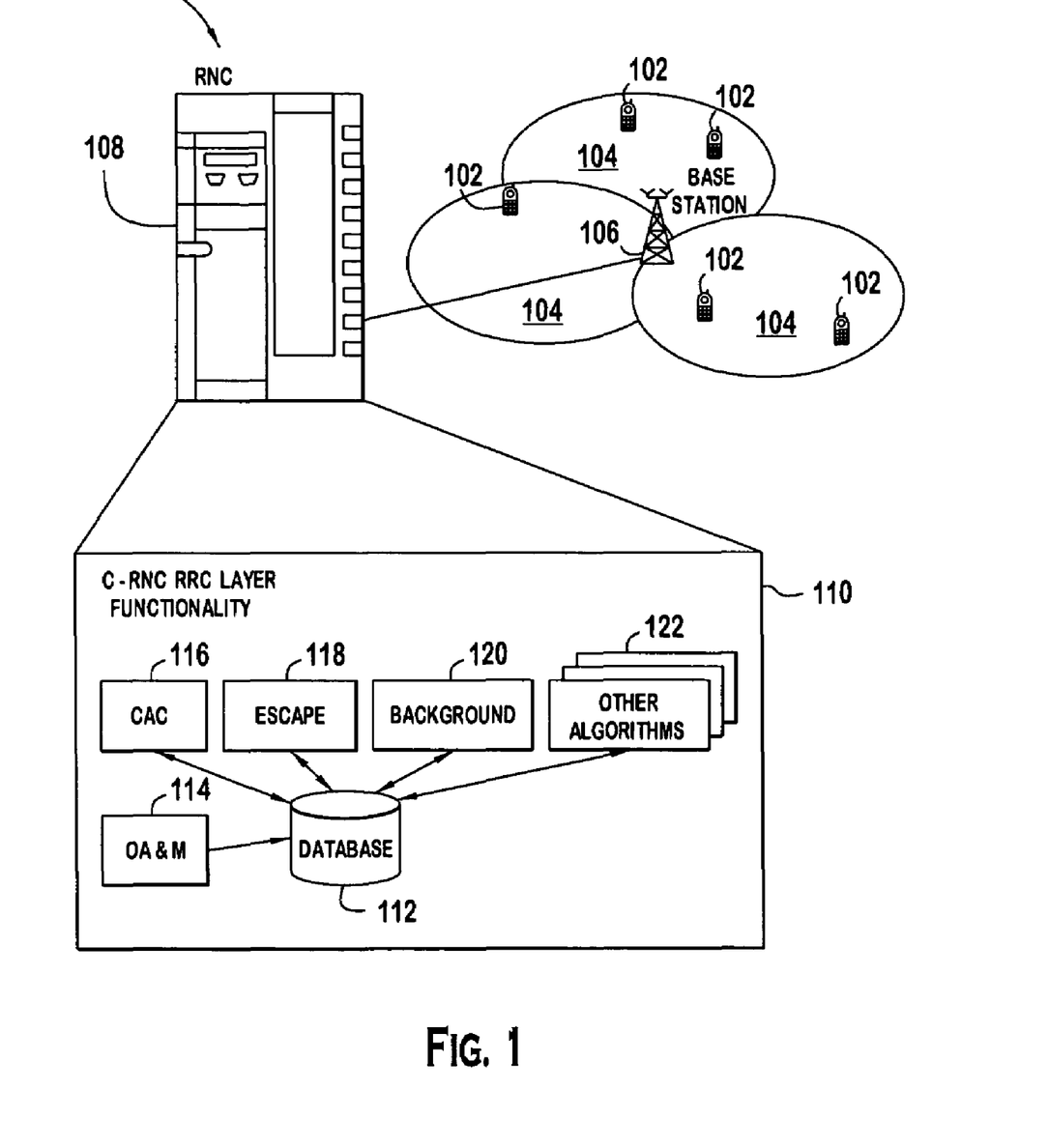
FIG. 1 is an overview of a system constructed in accordance with the present invention.

FIG. 1 shows an overview of a communication system 100 constructed in accordance with the present invention. A plurality of WTRUs 102 are being used in several cells 104 and are served by a base station 106 and a radio network controller (RNC) 108. The RNC 108 contains C-RNC radio resource control (RRC) layer functionality 110. The RRC layer functionality 110 is centered around a database 112, which stores information relating to all of the entities (i.e., base stations 106, cells 104, and WTRUs 102) under the control of the RNC 108. The database 112 receives operation and maintenance (OA&M) information 114 from the base stations 106, cells 104, and WTRUs 102.6

The information stored in the database 112 is accessed by various radio resource management (RRM) algorithms, such as call admission control (CAC) 116, escape 118, background interference reduction 120, and other algorithms 122. The database 112 serves as a centralized storage for the RNC 108, and can be used by any algorithm that needs the type of information that would be stored at the RNC 108, and is not limited to the algorithms specifically mentioned above.

The database 112 is preferably centralized at the C-RNC layer 110 so that the information can be accessed by all of the instances of the RRM functions 116-122 from different cells 104. The C-RNC layer 110 needs to be able to obtain the information about physical resource allocation of the cells 104 and the WTRUs 102 under its control. If the information is stored in multiple locations, the algorithms 116-122 running in the C-RNC layer 110 would then need to query different data stores to retrieve the information required to make a decision. This type of scattered retrieval adds unnecessary interfaces and processing delay between the different entities.

Figure 2:
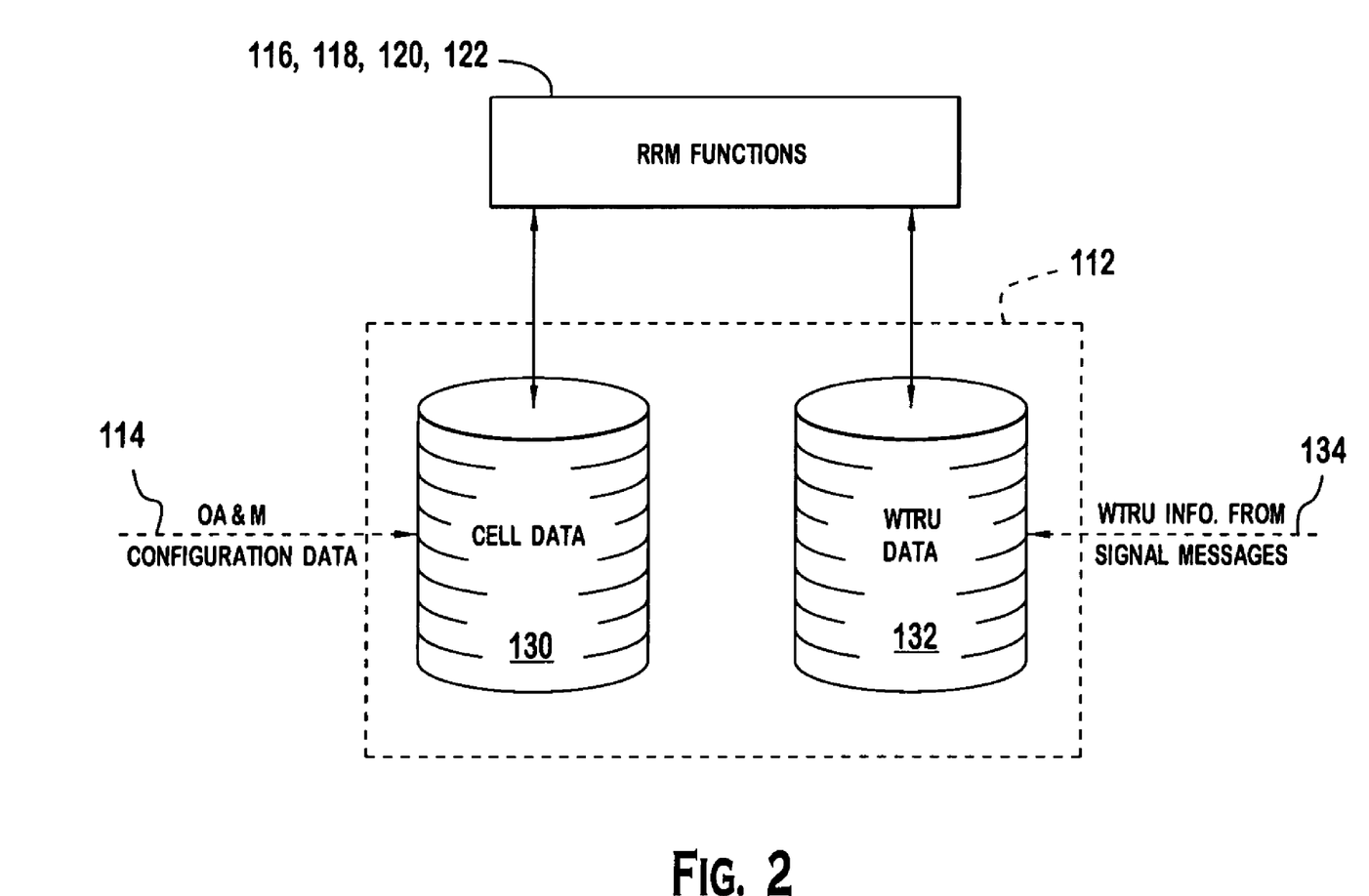
FIG. 2 is a detail diagram of the database shown in FIG. 1.

Referring now to FIG. 2, the database 112 consists of cell-related data 130 and WTRU-related data 132. The cell data 130 includes OA&M configuration data 114. The WTRU data 132 includes information received from signaling messages 134 from the WTRUs 102, such as WTRU capability and WTRU measurements. The information can be divided into three major groupings: (1) the OA&M configuration data 114, (2) the cell-specific data 130, and (3) the WTRU-specific data 132.

When used with a CAC function 116, for example, the cell data 130 and the WTRU data 132 are input to the CAC function 116 along with cell resource allocation information, such as the code vector and the allocated code(s). After the CAC function 116 has decided how to allocate the physical resources, it records the output into the database 112 with the cell data 130 and the WTRU data 132 so that the algorithms 116-122 running in the C-RNC layer 110 can make decisions based upon the most recent resource allocation information.

Since the RRM data is shared by multiple instances of an RRM function, data integrity is maintained. An exclusive lock may be applied when a function instance is performing a writing operation. For a data record that is locked by the exclusive lock, no other instance of a function can access that data record until the function unlocks it. A shared lock can be applied when one function instance is reading information. For a data record that is locked by the shared lock, no other function instances can apply an exclusive lock to that data record until it is unlocked.

Figure 3:
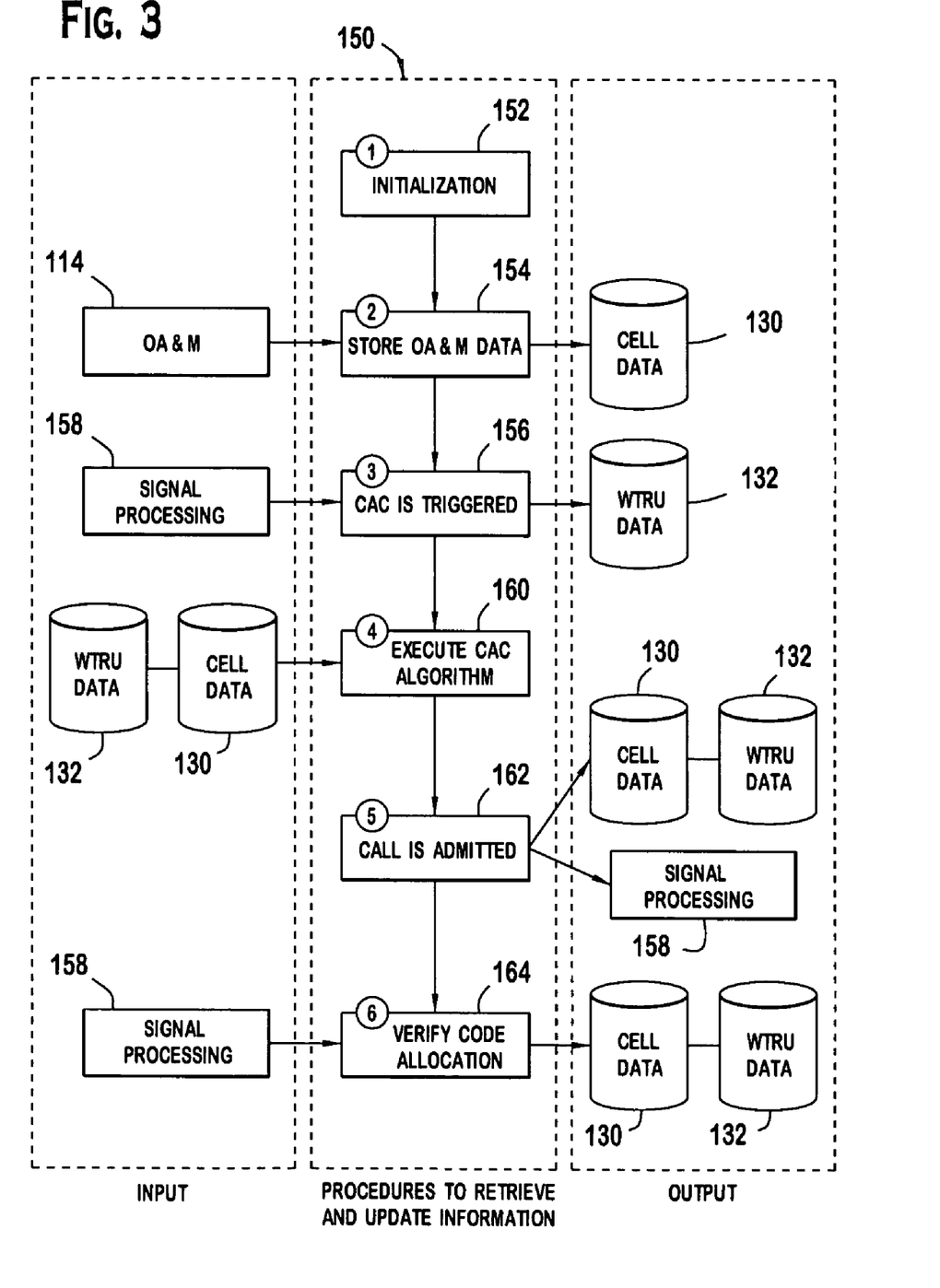
FIG. 3 is a diagram of a procedure to retrieve and update information and its interaction with the database shown in FIG. 1.

FIG. 3 is a diagram showing a procedure to retrieve and update the information for the RRM CAC function and its interaction with the cell data 130 and the WTRU data 132. First, the RRM information storage structure is initialized during system initialization (step 152). Next, the OA&M data is stored at the RNC level and at the cell level based on the scope of the data (step 154). Some of the OA&M data is cell-specific, so it is stored with the cell data 130. Some of the OA&M data is the same for all of the cells under the same RNC, so this information is stored in the RNC record in the database 112.

The CAC function is triggered (step 156) based upon an incoming call notification from the signal processing 158. The signal processing 158 extracts WTRU capability information and WTRU intra-frequency measurement results that are carried by the incoming signal. The extracted information is stored with the WTRU data 132. The CAC function reads the timeslot information, the OA&M configuration data, and function-specific parameters from the cell data 130. The WTRU-related information is retrieved from the WTRU data 132 and the CAC algorithm is executed (step 160).

After the admission of a call (step 162), the newly allocated resources for the cell and the WTRU are stored with the cell data 130 and the WTRU data 132, respectively, so that the CAC function can check updated resource allocation information for new resource requests. The signal processing 158 sends signals to the base station to inform the base station of the configuration of the new call.

Lastly, the code allocation is verified (step 164), after receiving confirmation information from signal processing 158. The code allocation information is stored with the cell data 130 and the WTRU data 132 in step 162. Since there is a high probability that the procedure will be successful, the information is stored by default before receipt of the confirmation message. This default arrangement is designed to save processing time. In the event that the confirmation message is negative (indicating a failure case), the stored information for the call is removed from the cell data 130 and the WTRU data 132. The database can differentiate between the codes that have been allocated by CAC but are still pending confirmation and the codes that have been confirmed.

While the preceding example was described in connection with a CAC function, it is noted that similar interactions between the function, the cell data 130, and the WTRU data 132 occur during the operation of other functions.

Figure 4A:
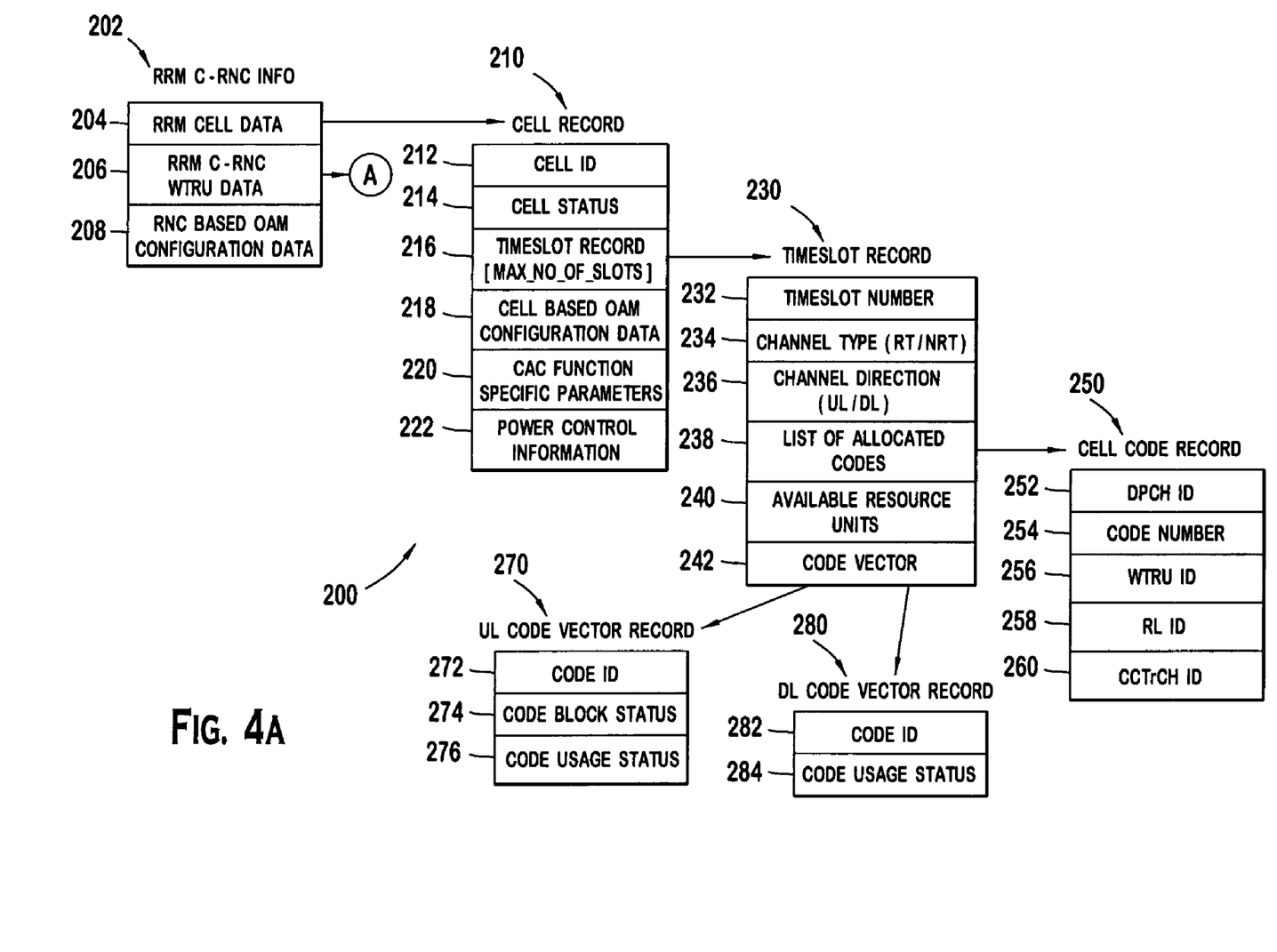
FIGS. 4a and 4b are block diagrams of a RRM data structure in accordance with the present invention.
Figure 4B:
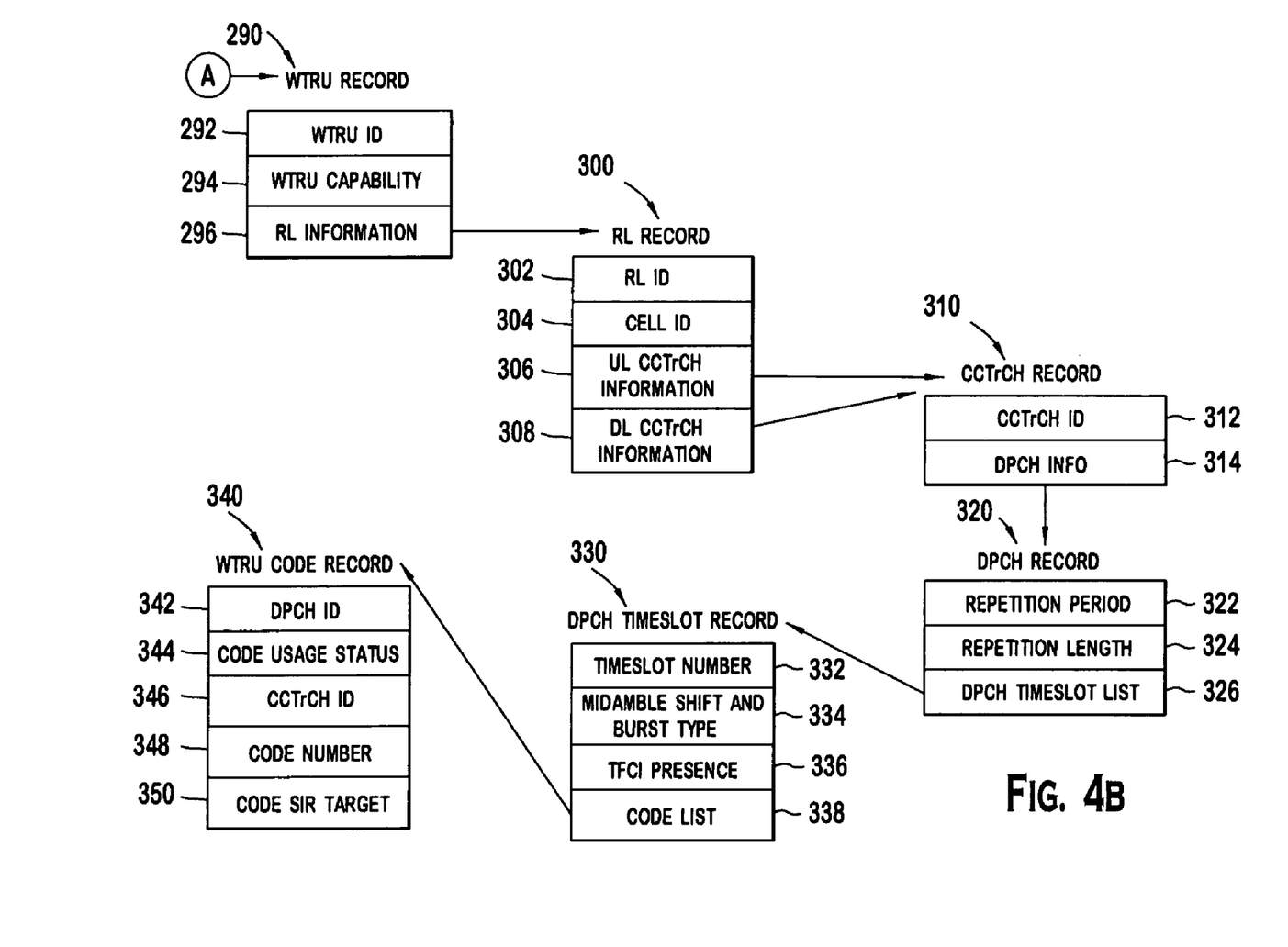

FIGS. 4a and 4b show a block diagram of an exemplary data structure 200 for centrally storing RRM information. It is noted that the data structure 200 may contain multiple records of each type; for sake of simplicity of illustration and explanation, the data structure will be described in connection with only a single record of each type. A RRM C-RNC information table 202 includes RRM cell data 204, RRM C-RNC WTRU data 206, and RNC-based OA&M configuration data 208.

The RRM cell data 204 consists of a cell record 210 having a cell identification field 212, a cell status field 214, a timeslot record 216, cell-based OA&M configuration data 218, CAC function-specific parameters 220, and power control information 222. The timeslot record 216 includes a timeslot number field 232, a channel type field 234, a channel direction field 236, a list of allocated codes 238, an available resource units field 240, and a code vector field 242. The list of allocated codes 238 consists of a cell code record 250 having a dedicated physical channel (DPCH) identification field 252, a code number 254, a WTRU identification field 256, a radio link (RL) identification field 258, and a coded composite transport channel (CCTrCH) identification field 260. There are two types of code vector fields 242, one for the uplink (UL) and one for the downlink (DL). The UL code vector record 270 includes a code identification field 272, a code block status field 274, and a code usage status field 276. The DL code vector record 280 includes a code identification field 282 and a code usage status field 284.

The RRM C-RNC WTRU data 206 consists of a WTRU record 290 having a WTRU identification field 292, a WTRU capability field 294, and a RL information field 296. The RL information field 296 includes a RL record 300 having a RL identification field 302, a cell identification field 304, an UL CCTrCH information field 306, and a DL CCTrCH information field 308. Both the UL CCTrCH information field 306 and the DL CCTrCH information field 308 consist of a CCTrCH record 310 having a CCTrCH identification field 312 and a DPCH information field 314.

The DPCH information field 314 includes a DPCH record 320 having a repetition period field 322, a repetition length field 324, and a DPCH timeslot list 326. The DPCH timeslot list 326 includes a DPCH timeslot record 330 having a timeslot number field 332, a midamble shift and burst type field 334, a transport format combination indicator (TFCI) presence field 336, and a code list 338. The code list 338 consists of a WTRU code record 340, having a DPCH identification field 342, a code usage status field 344, a CCTrCH identification field 346, a code number field 348, and a code SIR target field 350. It is noted that the CCTrCH identification field 346 is the same as the CCTrCH identification field 312, so that this information can be retrieved quickly.

The order used for storing the data records permits the rapid access of the information. For example, in a WTRU record, the information is stored in the sequence of RL, CCTrCH, and DPCH because DPCHs belong to a certain CCTrCH, and CCTrCHs belong to a certain RL.

The data structure described above in connection with FIGS. 4a and 4b can be applied to RRM algorithms, such as CAC, escape, or background interference reduction. While this invention has been particularly shown and described with reference to preferred embodiments, it will be understood by those skilled in the art that various changes in form and details may be made without departing from the scope of the invention as described hereinabove.

What is claimed is:

1. A controlling radio network controller (C-RNC) for use in radio resource management (RRM) functions, the C-RNC comprising:
    a central database, including resource allocation information such as cell data including resource assignment information for a cell and wireless transmit/receive unit (WTRU) data including WTRU capability information and WTRU radio link information;
    a radio resource management function for managing radio resources, said radio resource management function using resource allocation information stored in said central database, said radio resource management function updating said central database based on changes to the resource allocation information made by said radio resource management function.

2. The C-RNC according to claim 1, wherein said cell data includes a cell record having at least one of:
    a cell identification field;
    a cell status field;
    a timeslot record for each timeslot;
    a cell-based operations and maintenance configuration data field;
    call admission control function parameters; and
    a power control information field.

3. The C-RNC according to claim 2, wherein each timeslot record includes at least one of:
    a timeslot number field;
    a channel type field;
    a channel direction field;
    a list of allocated codes;
    an available resource units field; and
    a code vector field.

4. The C-RNC according to claim 3, wherein said list of allocated codes includes a cell code record having at least one of:
    a dedicated physical channel identification field;
    a code number field;
    a WTRU identification field;
    a radio link identification field; and
    a coded composite transport channel identification field.

5. The C-RNC according to claim 3, wherein said code vector field includes an uplink code vector record having at least one of:
    a code identification field;
    a code block status field; and
    a code usage status field.

6. The C-RNC according to claim 3, wherein said code vector field includes an downlink code vector record having at least one of:
    a code identification field; and
    a code usage status field.

7. The C-RNC according to claim 1, wherein said WTRU data includes a WTRU record having at least one of:
    a WTRU identification field;
    a WTRU capability field; and
    a radio link information field.

8. The C-RNC according to claim 7, wherein said radio link information field includes a radio link record having at least one of:
    a radio link identification field;
    a cell identification field;
    an uplink coded composite transport channel (CCTrCH) information field; and
    a downlink CCTrCH information field.

9. The C-RNC according to claim 8, wherein said uplink CCTrCH information field and said downlink CCTrCH information field include a CCTrCH record having at least one of:
    a CCTrCH identification field; and
    a dedicated physical channel (DPCH) information field.

10. The C-RNC according to claim 9, wherein said DPCH information field includes a DPCH record having at least one of:
    a repetition period field;
    a repetition length field; and
    a DPCH timeslot list.

11. The C-RNC according to claim 10, wherein said DPCH timeslot list includes a DPCH timeslot record having at least one of:
    a timeslot number field;
    a midamble shift and burst type field;
    a transport format combination indicator presence field; and
    a code list.

12. The C-RNC according to claim 11, wherein said code list includes a WTRU code record having at least one of:
    a DPCH identification field;
    a code usage status field;
    a CCTrCH identification field;
    a code number field; and
    a code signal to interference target field.

13. A method for improving the performance of radio resource management (RRM) functions in a wireless communications system, comprising the steps of:
    providing a data storage;
    storing resource allocation information for the wireless communications system in the data storage;
    accessing the data storage by a RRM function, wherein the RRM function obtains current resource allocation information for the wireless communications system;
    performing the RRM function; and
    updating the data storage based upon changes to the resource allocation in the wireless communications system made by the RRM function.

14. The method according to claim 13, wherein the providing step includes providing a centralized data storage in a controlling radio network controller.

15. The method according to claim 13, wherein the storing step includes storing operation and maintenance data in the data storage.

16. The method according to claim 13, wherein the storing step includes storing cell-specific data in the data storage.

17. The method according to claim 13, wherein the storing step includes storing wireless transmit/receive unit-specific data in the data storage.

18. The method according to claim 13, wherein the RRM function is a call admission control routine.

19. The method according to claim 13, wherein the RRM function is an escape mechanism.

20. The method according to claim 13, wherein the RRM function is a background interference reduction function.

21. A method for improving the performance of a call admission control (CAC) routine by storing commonly used data in a central database, the method comprising the steps of:

initializing the central database;

receiving operations and maintenance (OA&M) data;

storing the OA&M data it the central database;

triggering the CAC routine;

retrieving cell data and wireless transmit/receive unit data from the central database, the retrieved data to be used by the CAC routine;

executing the CAC routine and allocating resources to the newly admitted call; and storing information regarding the resources allocated to the newly admitted call in the central database.

* * * * *

UNITED STATES PATENT AND TRADEMARK OFFICE
CERTIFICATE OF CORRECTION

PATENT NO. : 7,248,878 B2  Page 1 of 1
APPLICATION NO. : 10/681026
DATED : July 24, 2007
INVENTOR(S) : Lu et al.

It is certified that error appears in the above-identified patent and that said Letters Patent is hereby corrected as shown below:

IN THE SPECIFICATION

At column 2, line 61, after "WTRUs", delete "102.6" and insert therefor --102.--.

Signed and Sealed this

Twenty-ninth Day of April, 2008

JON W. DUDAS
*Director of the United States Patent and Trademark Office*